United States Patent
Hsiao et al.

(10) Patent No.: US 7,519,983 B2
(45) Date of Patent: Apr. 14, 2009

(54) METHOD AND APPARATUS FOR FILTERING SDTV CHANNELS OF DIGITAL VIDEO BROADCASTING

(75) Inventors: Chi-Wei Hsiao, Jhonghe (TW); Jin-Min Lin, Taipei (TW); Wen-Ming Huang, Dasi Township, Taoyuan County (TW)

(73) Assignee: Genesys Logic, Inc., Taipei (TW)

( * ) Notice: Subject to any disclaimer, the term of this patent is extended or adjusted under 35 U.S.C. 154(b) by 759 days.

(21) Appl. No.: 11/072,272

(22) Filed: Mar. 7, 2005

(65) Prior Publication Data
US 2006/0218582 A1    Sep. 28, 2006

(51) Int. Cl.
*H04N 7/16* (2006.01)
(52) U.S. Cl. .................................. 725/152; 370/386
(58) Field of Classification Search ................ 725/38, 725/36, 138, 144–152; 370/386
See application file for complete search history.

(56) References Cited

U.S. PATENT DOCUMENTS

| | | | | |
|---|---|---|---|---|
| 3,781,820 A | * | 12/1973 | Cochran et al. | 708/142 |
| 5,958,020 A | * | 9/1999 | Evoy et al. | 710/3 |
| 2004/0001492 A1 | * | 1/2004 | Johnson | 370/395.32 |
| 2004/0190513 A1 | * | 9/2004 | Hakkarainen et al. | 370/389 |
| 2006/0158864 A1 | * | 7/2006 | Gay | 361/785 |
| 2007/0067816 A1 | * | 3/2007 | Van Horck et al. | 725/100 |

* cited by examiner

*Primary Examiner*—Christopher Kelley
*Assistant Examiner*—Mulugeta Mengesha
(74) *Attorney, Agent, or Firm*—Rosenberg, Klein & Lee

(57) ABSTRACT

A method for filtering the SDTV channels in a DVB is provided, including the following steps: using the video frequency ID and center frequency of the SDTV channel of the user's choice to look up a table to obtain at least a remaining video frequency ID different from the video frequency ID of the SDTV channel, while the remaining video frequency ID having the same center frequency as the SDTV channel; configuring a plurality of registers in the controller; and the controller discarding a plurality of DVB packets according to the registers. The controller can be either a PCI_EXPRESS controller or a USB controller.

10 Claims, 3 Drawing Sheets

METHOD AND APPARATUS FOR FILTERING SDTV CHANNELS OF DIGITAL VIDEO BROADCASTING

BACKGROUND OF THE INVENTION

1. Field of the Invention

The present invention generally relates to the field of digital video broadcasting and, more particularly, to a method and related controlling apparatus for filtering the SDTV channels in a digital video broadcasting.

2. The Related Art

As the constant improvement in technologies, people have an increasing demand on higher quality of TV broadcasting. Digital video broadcasting (DVB), providing better quality of audiovisual programs, are gaining attentions in recent years.

The USB ports of personal computers (PCs) can be used to connect many universal serial bus (USB) peripherals, including USB keyboard, USB mouse, USB card reader, USB flash drive, external USB hard disk, USB printer, and USB scanner. The USB ports provide convenience to the users. The transmission speed of USB has also evolved from the 12 Mbps of USB1.1 to the recent 480 Mbps of USB2.0.

According to the transmission specification of USB, the USB1.1 can support low speed peripherals, such as USB keyboard, USB mouse, and USB joy stick, whose transmission speed is 1.5 Mbps with the tolerance of 1.5%, and the full speed peripherals, such as USB flash drive, USB printer, and USB scanner, whose transmission speed is 12 Mbps with a tolerance of 0.25%. On the other hand, USB2.0 is capable of supporting high-speed peripherals, whose transmission speed is as high as 480 Mbps. USB2.0 is downward compatible with the USB1.1, and therefore, USB2.0 can support low speed, full speed and high-speed peripherals.

FIG. 1 of the attached drawings shows a schematic view of a typical USB DVB reception device, including an antenna 100, a tuner 110, a demodulator 120, and a USB controller 130. The DVB signal, including video signal, audio signal and control packets, transmitted through air enters antenna 100. The DVB reception device uses tuner 110 to receive RF signals, uses demodulator to demodulate the RF signals, and sends an MPEG2 video signal to USB controller 130 for using its USB2.0 high-speed interface to communicate with the host.

FIG. 2 shows a transmission packet 200 of the DVB. Each packet is 188 bytes long, including a program ID (PID) for indicating the type of the packet.

SUMMARY OF THE INVENTION

The present invention provides a method for filtering the SDTV channels in a DVB, including the following steps: using the video frequency ID and center frequency of the SDTV channel of the user's choice to look up a table to obtain at least a remaining video frequency ID different from the video frequency ID of the SDTV channel, while the remaining video frequency ID having the same center frequency as the SDTV channel; configuring a plurality of registers in the controller; and the controller discarding a plurality of DVB packets according to the registers. The controller can be either a PCI_EXPRESS controller or a USB controller.

The present invention also provides a USB controller for filtering DVB sun-channels, including a media access control (MAC) circuit having a first register and a second register for receiving a plurality of packets; and a USB physical layer circuit coupling to the MAC for transmitting USB electrical signals. The MAC selectively discards the packets in accordance with the first and the second registers. The MAC also configures the first and the second registers through the application program on the host. The packets can be roughly categorized into video packet, audio packet and control packet. Preferably, the MAC writes a plurality of video frequency ID into the first and the second registers so that the MAC can selectively discard the unwanted video packets in accordance with the first and the second registers.

BRIEF DESCRIPTION OF THE DRAWINGS

The present invention will be apparent to those skilled in the art by reading the following description of a preferred embodiment thereof and the best mode for carrying out the invention, with reference to the attached drawings, in which.

DETAILED DESCRIPTION OF THE PREFERRED EMBODIMENT

The following table shows the channels of the digital broadcast in Taiwan, including CTV, PBS, FTV, TTV, and CTS. All the TV stations have fixed channels, and a plurality of SDTV channels can be broadcast simultaneously. For example, TTV uses the central frequency at 581 MHz, and can transmit three SDTV channels to the audience for selection. Each SDTV channel has a different video frequency PID and an audio frequency PID, and uses a bandwidth of 6 MHz. In addition, the control packets for all PIDs are also transmitted in the used frequency.

| Frequency Name | Frequency | Video Freq ID | Audio Freq ID |
|---|---|---|---|
| CTV1 | 53300 | 33 | 36 |
| CTV2 | 53300 | 49 | 52 |
| PBS1 | 54500 | 2011 | 2012 |
| PBS2 | 54500 | 2021 | 2022 |
| PBS3 | 54500 | 0 | 2032 |
| FTV1 | 55700 | 3001 | 3002 |
| FTV2 | 55700 | 3011 | 3012 |
| FTV3 | 55700 | 3021 | 3022 |
| TTV1 | 58100 | 4001 | 4002 |
| TTV2 | 58100 | 4011 | 4012 |
| TTV3 | 58100 | 4021 | 4022 |
| CTS1 | 59300 | 5011 | 5012 |
| CTS2 | 59300 | 5021 | 5022 |
| CTS3 | 59300 | 5031 | 5032 |

If the packets are to be filtered by using hardware, the hardware design will at least requires a few tens of registers to record the intended PIDs for comparison before forwarding to the next stage. If the packet is matched with any PID stored in the registers, the packet is discarded. It is worth noticing that such a design requires a large number of hardware registers, say, 64 registers, in order to filter the channels and control packets. In addition, this type of hardware design is lack of flexibility for expansion and limits the types of the control packets that it can filter.

Figure 1:
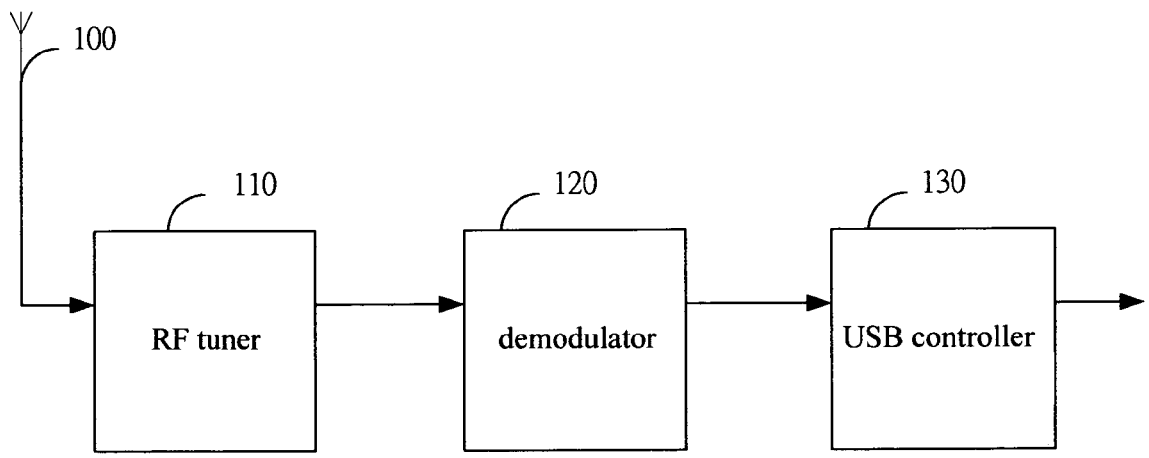
FIG. 1 shows a schematic view of a block diagram of a typical USB digital video broadcast receiver.
Figure 2:
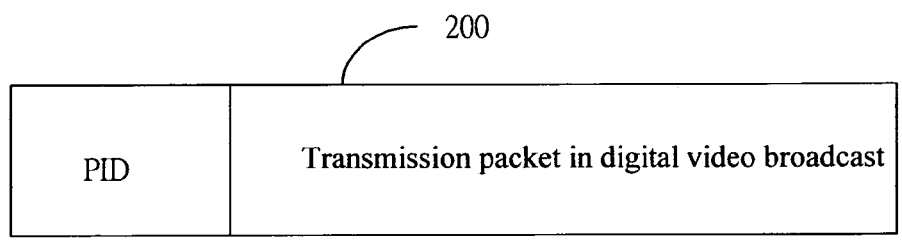
FIG. 2 shows a typical packet transmitted in a digital video broadcast.
Figure 3:
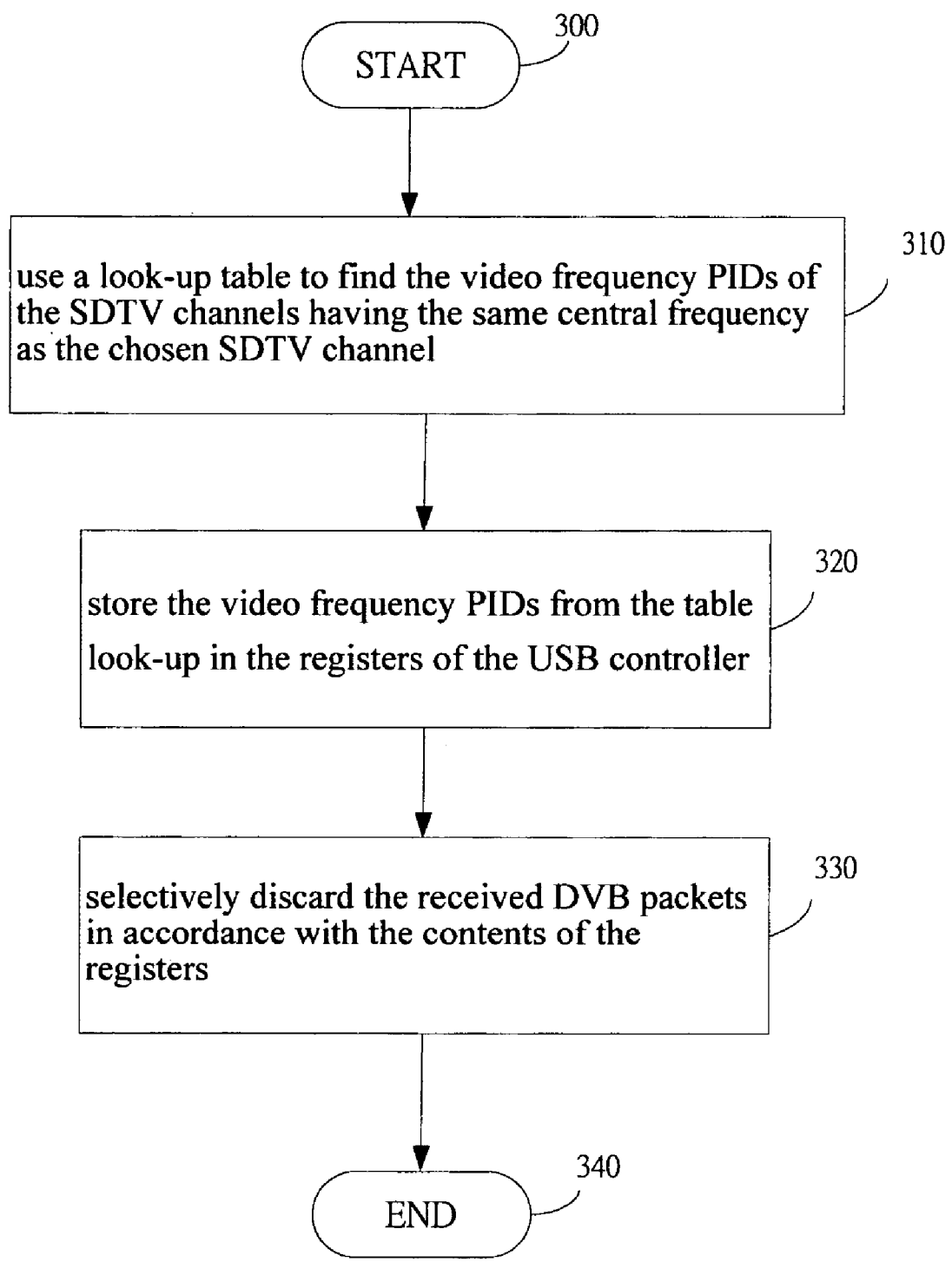
FIG. 3 shows a flowchart of a method for filtering SDTV channels in a digital video broadcast in accordance with the present invention.

FIG. 3 shows a flowchart of the method for filtering digital video broadcast (DVB) SDTV channels. The process starts with step 300. In step 310, the user selects a SDTV channel, and the application program on the host uses a table to look up the IDs of all the other SDTV channels having the same center frequency as the selected SDTV channel. For example, if the user selects TTV1, which has the center frequency at 581 MHz, the host knows that the video and audio frequency ID of the selected channel is 4001 and 4002, respectively. The application program looks up the table, and finds that the other video frequency IDs that have the same center frequency are 4011 and 4021. In step 320, the application program on the host stores the video frequency 4011 and 4021 into the registers in the controller of the peripheral device, such as the registers in USB controller or PCI_EXPRESS controller. In step 330, the received packets are selectively discarded in accordance with the video frequency IDs stored in the registers of USB controller or PCI_EXPRESS controller. In other words, the present invention uses a simple hardware structure to enable the controller to selectively discard, based on the PID of each packet, the unwanted packets that do not belong to the selected SDTV channel. This saves the transmission bandwidth of the controller as well as the host.

Furthermore, every SDV channel includes video signals, audio signals, and numerous types of control packets, and has the bandwidth of 6 Mbps (mega-bits per second). The transmission speed of USB2.0 has the bandwidth of 480 Mbps, which is sufficient for DVB. However, USB1.1 has the bandwidth of 12 Mbps, which is smaller than the sum of the SDTV channels having the same center frequency. For example, there are three SDTV channels in TTV, whose center frequency is 581 MHz, and therefore, the total bandwidth is 18 Mbps, which exceeds the 12 Mbps available in USB1.1. Without filtering SDTV channels at the hardware end, the transmission bandwidth becomes problematic. If the present invention is used in a USB controller, the unnecessary video signals can be discarded at the hardware end. As the video signal uses most of the bandwidth in transmission, the available bandwidth is sufficient even if the unnecessary audio signal and control packets are not filtered. In this way, the USB1.1 provide sufficient bandwidth for receiving an SDTV channel and transmitting all the received packets to the host for further processing. Therefore, the present invention realizes the SDTV channel selection using a simple hardware design, and allows more flexibility by leaving the control packet processing to application program.

Figure 4:
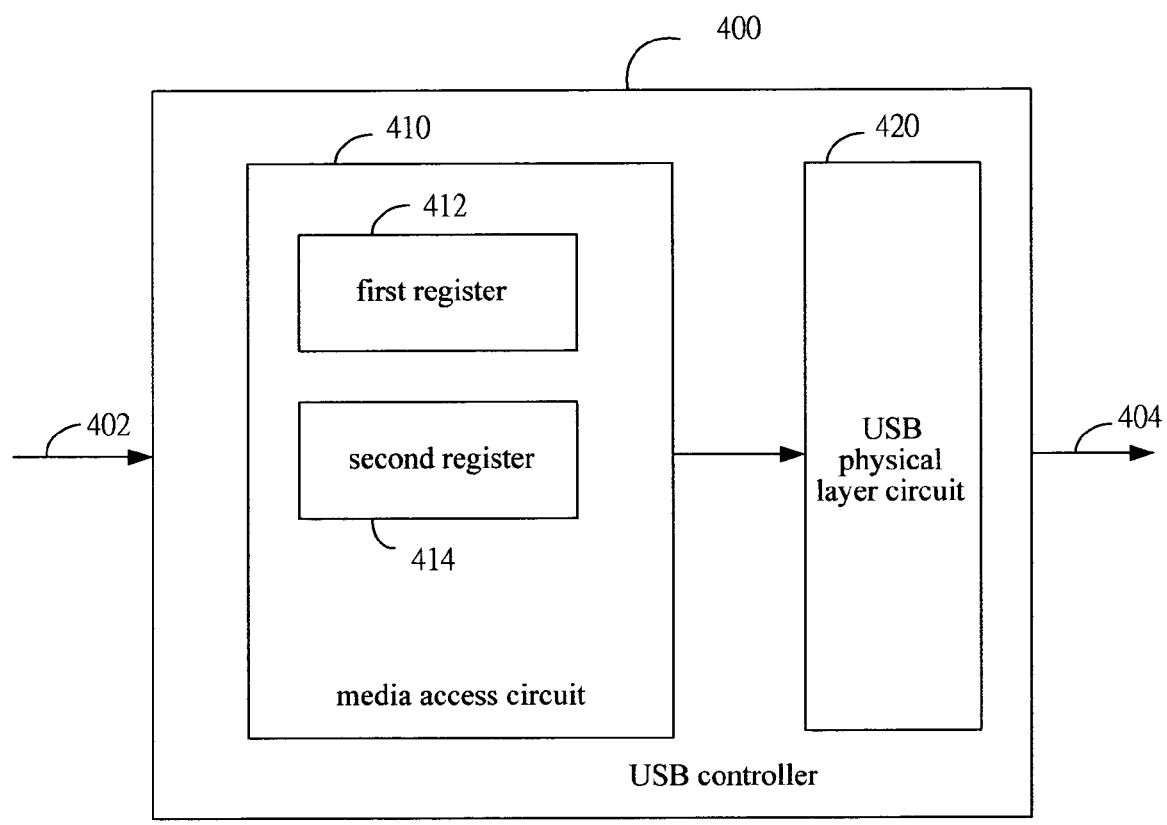
FIG. 4 shows a schematic view of a block diagram of a USB controller for filtering SDTV channels in a digital video broadcast in accordance with the present invention.

FIG. 4 shows a schematic view of a block diagram of the USB controller for filtering DVB SDTV channel. A USB controller 400 uses a bus 402 to receive the data influx of all the SDTV channels of DVB, preferably in the MPEG2 video format. USB controller 400 includes a media access control (MAC) circuit 410, and a USB physical layer (PHY) circuit 420. MAC 410 further includes a first register 412 and a second register 414 for providing the storage for the application program on the host to fill in the video frequency ID to be filtered. MAC 410 uses the contents stored in the registers to compare with the PID of each received packet, and discards the video packets whose PID does not belong to the selected SDTV channel. USB PHY circuit 420 uses USB protocol to transmit the filtered data influx through bus 404 to the host. This saves the bandwidth of both USB controller 400 and the host. Using the aforementioned example, when the user selects the TTV1 channel, the corresponding video and audio IDs are 4001 and 4002, respectively. Preferably, the application program looks up a table to find the remaining video IDs sharing the same center frequency are 4011 and 4021. The remaining video IDs 4011, namely, 4011 and 4021, are stored in first register 412 and second register 414. When MAC 410 receives DVB packets through bus 402, each packet being 188-byte long, MAC 410 compares the PID in each packet with the contents of first register 412 and second register 414. If they match, the packets can be discarded to save the transmission bandwidth of USB controller 400 and the host.

The aforementioned embodiment uses two registers as example, and each register is preferably one-word long because the present DVB has three SDTV channels using a center frequency. However, the design can be changed to accommodate the case when N SDTV channels shares a center frequency. In this case, MAC 410 preferably includes N–1 registers for storing the IDs of unnecessary video signals. Therefore, the present invention uses a smaller number of registers to filter the SDTV channels, and the firmware needs to compare less number of data and execute less operation. The chip size can be reduced and the power consumption can also be reduced. On the other hand, the present invention does not intercept any control packet, so that the control packets not belonging to the selected channel are also transmitted to the host for further processing. Thus, this design allows a higher flexibility.

In summary, the present invention provides a method for filtering the SDTV channels in a DVB, including the following steps: using the video frequency ID and center frequency of the SDTV channel of the user's choice to look up a table to obtain at least a remaining video frequency ID different from the video frequency ID of the SDTV channel, while the remaining video frequency ID having the same center frequency as the SDTV channel; configuring a plurality of registers in the controller; and the controller discarding a plurality of DVB packets according to the registers. The controller can be either a PCI_EXPRESS controller or a USB controller.

The present invention also provides a USB controller for filtering DVB sun-channels, including a media access control (MAC) circuit having a first register and a second register for receiving a plurality of packets; a USB physical layer circuit coupling to the MAC for transmitting USB electrical signals. The MAC selectively discards the packets in accordance with the first and the second registers. The MAC also configures the first and the second registers through the application program on the host. The packets can be roughly categorized into video packet, audio packet and control packet. Preferably, the MAC writes a plurality of video frequency ID into the first and the second registers so that the MAC can selectively discard the unwanted video packets in accordance with the first and the second registers.

Although the aforementioned embodiment uses USB controller as an example, the controller can also be a PCI_EXPRESS controller.

Although the present invention has been described with reference to the preferred embodiment thereof and the best mode for carrying out the invention, it is apparent to those skilled in the art that a variety of modifications and changes may be made without departing from the scope of the present invention which is intended to be defined by the appended claims.

What is claimed is:

1. A method for filtering digital video broadcast SDTV channels, comprising the steps of:

using a selected SDTV channel of a user's choice to look up a table to obtain a result, said SDTV selected channel having a center frequency and a video frequency ID and said result including video frequency IDs of non-selected SDTV channels having a center frequency in common with said selected SDTV channel;

writing said video frequency IDs of non-selected SDTV channels having a center frequency in common with said selected SDTV channel into respective first and said second registers of a controller; and discarding a plurality of DVD packets having a correspondence with said frequency IDs in said first and second registers.

2. The method as claimed in claim 1, wherein said controller is a USB controller.

3. The method as claimed in claim 1, wherein said controller is a PCI_EXPRESS controller.

4. A controller for filtering digital video broadcast SDTV channel, comprising:

a media access control (MAC) circuit having a first register and a second register for receiving a plurality of packets, said MAC circuit writes a plurality of video frequency IDs of particular non-selected SDTV channels into said first and said second registers; and a USB physical layer circuit coupled to said MAC circuit for transmitting USB electrical signals;

wherein said MAC circuit selectively discards said packets having a correspondence with said frequency IDs in said first and said second registers.

5. The controller as claimed in claim 4, wherein said controller is a USB controller.

6. The controller as claimed in claim 4, wherein said controller is a PCI_EXPRESS controller.

7. The controller as claimed in claim 4, wherein said MAC circuit configures said first and said second registers through an application program on a host.

8. The controller as claimed in claim 4, wherein said packets further comprise a plurality of video packet, a plurality of audio packet and a plurality of control packet.

9. The controller as claimed in claim 4, wherein said registers are one-word long.

10. A controller for filtering digital video broadcast SDTV channel, comprising:

a media access control (MAC) circuit having a first register and a second register for receiving a plurality of packets, said packets including a plurality of video packets, a plurality of audio packets and a plurality of control packets; and a USB physical layer circuit coupled to said MAC circuit for transmitting USB electrical signals;

wherein said MAC circuit writes a plurality of video frequency IDs into said first and said second registers and said MAC circuit selectively discards said packets in accordance with said first and said second registers.

\* \* \* \* \*